United States Patent [19]

Tsuge et al.

[11] Patent Number: 4,634,338
[45] Date of Patent: Jan. 6, 1987

[54] WORKPIECE CONVEYING APPARATUS

[75] Inventors: Eiji Tsuge; Taminori Yanagisawa, both of Toyota; Takaharu Yamaguchi, Toyokawa; Hiroshi Fukatsu, Toyota, all of Japan

[73] Assignees: Toyota Jidosha Kabushiki Kaisha; Taiho Seiki Kabushiki Kaisha, both of Toyota, Japan

[21] Appl. No.: 791,440

[22] Filed: Oct. 25, 1985

Related U.S. Application Data

[62] Division of Ser. No. 599,866, Apr. 13, 1984, Pat. No. 4,574,941.

[30] Foreign Application Priority Data

Apr. 14, 1983 [JP] Japan ................. 58-065972

[51] Int. Cl.⁴ ............. B65G 25/02; B23Q 7/04
[52] U.S. Cl. ..................... 414/752; 414/917; 414/733; 414/737; 198/468.2; 198/476.1
[58] Field of Search ............. 198/468.2, 476.1; 414/733, 737, 917, 222, 752; 901/14; 74/25, 27, 103, 54; 100/207

[56] References Cited

U.S. PATENT DOCUMENTS

| | | | |
|---|---|---|---|
| 1,776,573 | 6/1930 | Westin | 414/733 |
| 2,811,266 | 10/1957 | Udal | 414/733 |
| 2,948,417 | 8/1960 | Haanes | 414/733 |
| 3,061,118 | 10/1962 | Halberstadt | 414/737 X |
| 3,902,606 | 9/1975 | Ronbeck | 414/733 |
| 4,096,953 | 6/1978 | Kellermann et al. | 414/737 |
| 4,400,984 | 8/1983 | Ronbeck | 74/103 |
| 4,530,637 | 7/1985 | Mason et al. | 414/733 |
| 4,585,389 | 4/1986 | Watanabe et al. | 414/752 |
| 4,589,819 | 5/1986 | Shirao | 414/752 |

Primary Examiner—Terrance L. Siemens
Attorney, Agent, or Firm—Cushman, Darby & Cushman

[57] ABSTRACT

A workpiece conveying apparatus for a working machine including provided with a slider rail arranged vertically on the body of the workpiece conveying apparatus, a drive source, a parallel link consisting of the slider link which is fitted crossing at right angles to and slidably in said slider rail, a slider arm, a lower slider link carrying a work holder and a sub arm and being connected rotatably with each other, a rocking lever being connected to the middle portion of the slider arm rotatably and rocked by a driving mechanism at a predetermined angle, whereby the work holder can convey a workpiece into or out of the specified position along with the intentional locus settled selectively so as to reduce the operating range, and keep a continuous working operation of the working machine, resulting in the durability of the working machine.

7 Claims, 20 Drawing Figures

WORKPIECE CONVEYING APPARATUS

This is a division of application Ser. No. 599,866, filed Apr. 13, 1984, now U.S. Pat. No. 4,574,941.

BACKGROUND OF THE INVENTION

1. Field of the Invention

The present invention relates to a workpiece conveying apparatus for use in conjunction with a working machine such as, for example, a press. The conveying apparatus is used when the workpiece (i.e., an article to be worked) is loaded into or unloaded from a die or jig of the press, conveyed from one step to a subsequent step or aligned.

2. Description of the Prior Art

In a working machine such as, for example, a press, a conveying apparatus is used to load or unload a workpiece into or from a die or jig of the working machine. Conveying apparatus of the prior art is usually constructed by combining a mechanism for moving the workpiece in a horizontal direction with a mechanism for moving the workpiece in a vertical direction. A conventional workpiece conveying apparatus is usually equipped with a drive source separate from that of the associated working machine. Therefore, it cannot have its work conveying operation accurately timed to be synchronous with the opening and closing operations of the working machine. Instead, it performs with so-called "intermittent operation", in which the opening operation of the working machine is elongated, if a danger of interference is taken into consideration. As a result, the working machine has an increased number of starts and stops which leads to an increase in fatigue and damage.

In recent years, there has been developed a workpiece conveying apparatus which eliminates the aforementioned operational disadvantage by using a drive source common to the conveying apparatus and the working machine. However, even their recently developed conveying apparatus is unsatisfactory, as will be discussed further on.

The common drive source runs the working machine continuously while the conveying apparatus and the working machine having their respective operations time coordinated. The conveying apparatus of the kind developed will be explained with reference to FIGS. 16 to 20 (all PRIOR ART) in connection with an embodiment in which it is applied to a press machine. Indicated at reference numeral 51 is a drive source which is made rotatable in synchronism with a motor for driving an upper die 68. The rotation of the drive source is reduced through a belt 51a by a reduction mechanism 52 to that the reduced rotations are transmitted to a sector gear 54 through a piston rod 53 which is connected to a crankshaft of the reduction mechanism 52. A rocking lever 57 is fixed to a gear 56, which is made rotatable in meshing engagement with the arcuate teethed portion 55 of the sector gear 54 enabled to reciprocatively rock at a predetermined angle by that piston rod 53, so that it reciprocatively rocks together with the sector gear 54. To the leading end of that rocking lever 57, there is connected rotatably a slider arm 58 which constitutes a parallel link mechanism together with a slider link 59, a lower side link 60 and a sub arm 61. The slider link 59 is non-rotationally but slidably fitted in a vertically extending slider rail 62 so that the lower side link 60 of the aforementioned parallel link mechanism may be moved while keeping its horizontal position by the reciprocal rocking motions of the rocking lever 57. Indicated at numeral 64 is a work holder which is equipped with a sucking cup 65 at its leading end. Here, if the piston rod 53 is moved up and down, the locus drawn by a link pin 63 can be so set by the rocking angle of the reciprocal rocking motions of the rocking level 57 as is indicated at letter A in FIG. 17. Reference numerals 66 and 67 appearing in FIG. 16 indicate that locus and the position of the sucking cup after movement, respectively.

According to the conveying apparatus thus constructed, the locus of the working motion drawn by the sucking cup 65 follows that of the returning motion drawn during the returning action. Here, the explanation to be made is directed to the case wherein the work holder conveys the work in loading, for example. As shown in FIG. 8 (PRIOR ART), when the upper die 68 is at the top dead point of its stroke H, a workpiece W is conveyed in by the sucking cup 67, and only this cup 67 returns. At this time, the sucking cup 67 comes out of the die along the same locus as that traversed during loading. Despite this fact, the vertical stroke H of sucking cup 65 has to be made considerably large in the vertical direction in view of the fact that the workpiece is usually set in the die. Moreover, during the time period from the instant when the upper die 68 reaches the top dead point to the instant when the die 68 begins to move down for a working operation, upper die 68 has to be temporarily stopped, until the work holder comes in the die and leaves the die, so as to avoid interference with the work holder, thus causing an operational disadvantage in that working efficiency is degraded. FIG. 1 (PRIOR ART) is a diagram showing the timing of the upper die and indicates that the working machine has a stand-by time at its top dead point. On the other hand, FIG. 20 (PRIOR ART) is a cycle diagram in which the displacement of the die is plotted against the crank angle of the working machine.

SUMMARY OF THE INVENTION

It is, accordingly, an object of the present invention to overcome the operational disadvantages of the prior art work conveying apparatus.

The workpiece conveying apparatus for a working machine according to the present invention comprises: a slider rail arranged on the body of the work conveying machine having a rotating drive source; a slider link fitted slidably in said slider rail; a slider arm, a lower side link having a work holder, and a sub arm constituting a parallel link mechanism together with said slider link; means for rocking reciprocatively and symmetrically a rocking lever having its base end integrally fixed and its other end connected rotatably to a middle portion of said slider arm.

According to the workpiece conveying apparatus of the present invention, moreover, the workpiece conveying locus can be so set as to reduce the operating range, shorten the working time period, and reduce the number of starts and stops of the working machine in accordance with the conditions of both the working machine to be used therewith and the workpiece. The conveying apparatus itself is enabled to convey in or out the work at a raised speed by changing the conveying locus, and the linearity of the vertical locus, in which the workpiece holder is moved up and down, is improved. If a speed variable electric motor is used as the rotating drive source, the control of the operating speed of the work holder can be freely selected so that the durability of the machine as a whole can be improved by reducing the speed of a step that does not require high speed.

DESCRIPTION OF THE PREFERRED EMBODIMENTS

Figure 1:
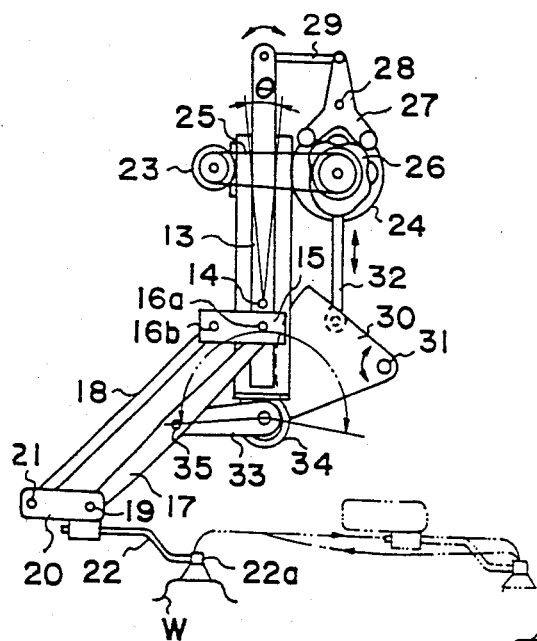
FIG. 1 is a front elevation showing one embodiment of the present invention.

The preferred embodiments of the present invention will now be described in detail with reference to the accompanying drawings. To aid in explanation of the invention, a press is used merely as an example of the working machine. Of course, the invention is not limited to use with a press. Indicated at reference numeral 13 in FIG. 1 is a slider rail which is so disposed that it can rock on a pin 14 within a predetermined angular range $\theta$ in the conveying direction of workpiece W. The slider rail 13 is so attached to the body of a not shown press (i.e., the working machine) as to extend in the vertical direction. A slider link 15 is so slidably fitted in the slider rail 13 that is longitudinal extension and the slider rail 13 cross at right angles. The upper end portion of a slider arm 17 is connected rotatably through a link pin 16a to one end portion of the slider link 15, and the upper end portion of a sub arm 18 is connected rotatably through a link pin 16b to the other end portion of the slider link 15. To the lower end portion of the slider arm 17, there is connected rotatably through a link pin 19 one end portion of a lower side link 20, which has its other end portion connected rotatably through a link pin 21 to the lower end portion of the sub arm 18. The slider link 15, the slider arm 17, the lower side link 20 and the sub arm 18 constitute together a parallel link mechanism. Indicated at numeral 22 is a vacuum cup type workpiece holder for sucking and holding workpiece W, which is removably attached to the lower side link 20.

Indicated at numeral 23 is a rotating drive source, which is exemplified by a speed variable electric motor made rotatable in synchronism with the rotating drive source of a not shown press and using both a position detecting pulse generator and a speed detecting d.c. motor. Moreover, the rotating drive source 23 is equipped with a starting and stopping clutch brake. An endless timing belt 25 is made to run on the rotating drive source 23 and a reduction mechanism indicated at numeral 24. This reduction mechanism 24 has its crankshaft formed integrally with a complex cam 26 which acts as a cam member. Indicated at numeral 27 is a bifurcated roller lever which is in sliding contact with the cam face of the complex cam 26. The roller lever 27 is enabled to rock on a pin 28 in the conveying direction of the workpiece W. The upper portion of the roller lever 27 is connected to the upper portion of the slider rail 13 through a connecting arm 29.

Indicated at numeral 30 is a sector gear which is adapted to reciprocatively rock in the vertical direction on a pin 31. On a suitable position of the sector gear 30, there is connected the lower end of a piston rod 32 which has its upper end connected to the crankshaft of the reduction mechanism 24. With the sector gear 30, there meshes a pinion gear 34 which is formed at the base end portion of a rocking lever 33. This rocking lever 33 has its leading end portion connected rotatably to a middle portion of the slider arm 17 through a pin 35. The rocking lever 33 has its center of rocking motions positioned on the vertical line which goes through the pin 14 of the slider rail 13 so that it can reciprocatively rock within a predetermined angular range $\theta$.

Now, if the rotating drive source 23 rotates in synchronism with the electric motor of the press, its rotations are reduced by the reduction mechanism 24 to impart the reciprocal rocking motions to the sector gear 30 through the piston rod 32 connected to the crankshaft of the reduction mechanism 24. Then, the rocking lever 33 is driven by the sector gear 30 so as to reciprocally rock, so that the slider link 15 vertically slides along the slider rail 13 through the slider arm 17. Simultaneously with this, the roller lever 27 is caused to rock on the pin 28 by the complex cam 26, which is made rotatable in synchronism with the rotating drive source 23, in accordance with the cam shape of that complex cam 26 the slider rail 13 rocks reciprocally on pin 14 along the conveying direction of the workpiece W.

Figure 2:
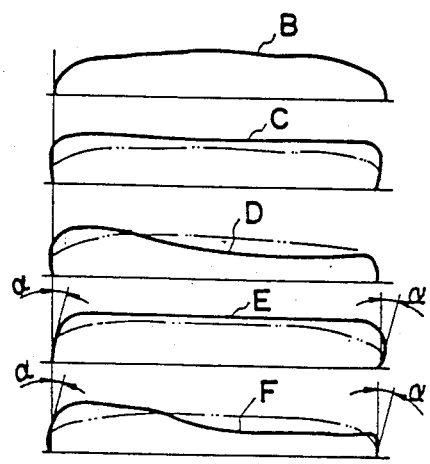
FIG. 2 is a diagram showing the motions of the sucking cup of FIG. 1.

As a result, slider link 15 performs the movement which is composed of the combination of the vertical motions by rocking lever 33 and the rocking motions by the complex cam 26. As a result, as shown in FIG. 2, the link pin 19 at the lower end portion of the slider arm 17 is caused to draw not a fundamental motion B providing a standard operational locus but the operation locus of a working motion C in accordance with the cam shape set for the object of complex cam 26, and the operational locus of a return motion D is drawn by returning motion of the work holder. Letters E and F appearing in FIG. 2 indicate the working and return motions of the leading end portion 22a of the work holder 22, respectively.

Since, in this case, the leading end portion 22a of the work holder 22 is positioned at a predetermined level lower than that of link pin 19, its motions are influenced thereby to the conveying direction of workpiece W, too, so that it moves at an inclination of angle $\alpha$ in the vicinities of the end portions of the motions.

Figure 3:
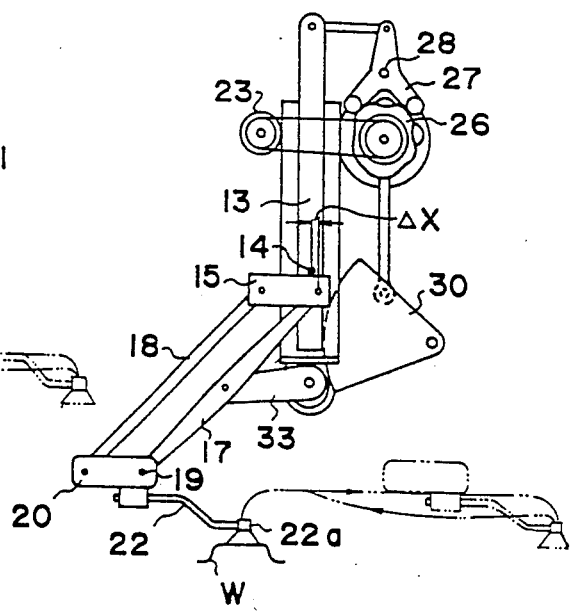
FIG. 3 is a front elevation showing a modification of the embodiment, in which the motions are modified.
Figure 4:
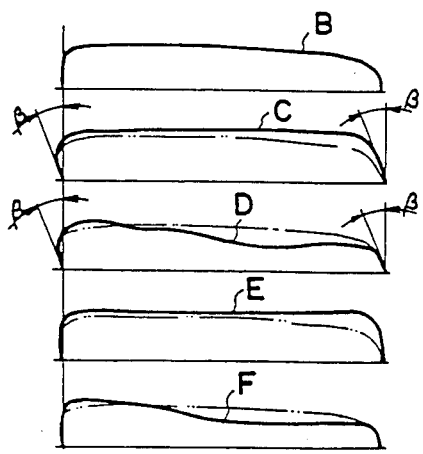
FIG. 4 is a diagram showing the motions of the modification of FIG. 3.

As shown in FIG. 3, therefore, if the pin 14 providing the fulcrum of the rocking motions of the slider rail 13 is displaced by a distance x in the conveying direction, the motion is inclined by an angle $\beta$ in the opposite direction in the vinicities thereof, as shown in FIG. 4, so that the angle of inclination $\alpha$ can be nullified by a combination of $\alpha$ and $\beta$. As a result, the working motion C and the return motion D of the aforementioned link pin 19 can follow the ideal operational loci.

Figure 5:
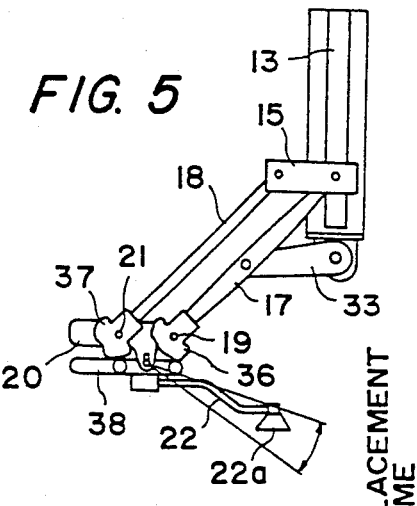
FIG. 5 is a front elevation showing an essential portion of another modification of the embodiment of FIG. 1.

Another method of effecting that motion correction may be effected, as shown in FIG. 5, by attaching cams 36 and 37 to the lower ends of the slider arm 17 and the sub arm 18, respectively, by attaching a lever 38 bearing the work holder 22, in such a manner that the upper face of the lever 38 may come into abutment against the cam 36 or 37 by a solenoid not shown.

Figure 6:
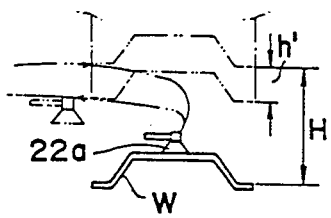
FIG. 6 is an enlarged view showing an essential portion of the work holder of the embodiment of FIG. 1.
Figure 7:
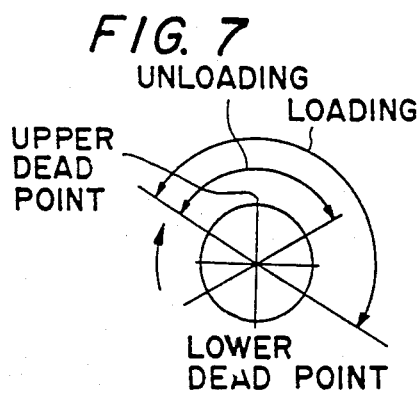
FIG. 7 is a diagram showing the timings of the embodiment of FIG. 1.
Figure 8:
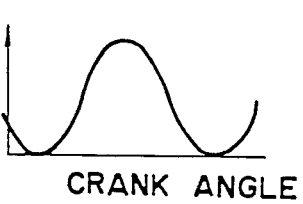
FIG. 8 is a diagram showing the cycle of the embodiment of FIG. 1.
Figure 9:
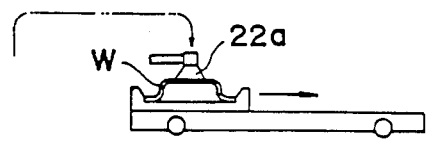
FIG. 9 is an enlarged view showing an essential portion of the constant pitch conveying system of the embodiment of FIG. 1.

According to the embodiment, the work holder 22 is enabled to draw the different working loci for the working motion E and the return motion F, and a surplus stroke can be given in the vicinity of the top dead point of the die by setting the level of the work holder 22 while coming out of the die at a lower level by h' than the stroke H of the die, as shown in FIG. 6, so that the stop period of the operation of the press at the top dead point can be shortened, if necessary, to zero or the minimum (cf. FIGS. 7 and 8). Moreover, the operating speed of the work holder 22 can be controlled to a desired level by using the speed-variable motor 24 as the drive source so that the conveying apparatus can start and stop at any position, as is different from the prior art in which the position is limited to the terminal position of the working motion E and the return motion F. Without further provision of a lifting device, a processing can be smoothly made to a subsequent step, and the construction can be simplified, as shown in FIG. 9.

Moreover, the reliability and durability of the conveying apparatus of the present invention is considerably enhanced over those of the prior art, in which the operating speed of the work holder is always at the maximum, by setting the operating speed of the work holder 22 at a higher level while the work holder 22 enters and comes out of the die and at a lower level during the remaining operational period.

Incidentally, the aforementioned motion changing mechanism effectively functions not only to change the levels of the working motion E and the return motion F of the work holder 22 but also to improve the vertical directioning during lifting and descending.

Figure 11:
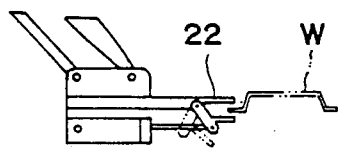
FIG. 11 is a front elevation showing an essential portion of the work holder of iron hand type.
Figure 10:
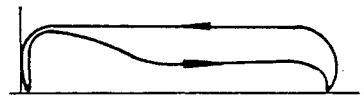
FIG. 10 is a diagram showing the motions which are obtained by reversing the complex cam of the embodiment of FIG. 1.

FIGS. 1, 3 and 6 all relate to the motions of the work loading. It is quite natural that even the motion of a work unloading can be made absolutely troubleproof by reversing the complexcam 26, as shown in FIG. 10. Furthermore, the work holder 22 used is of the vacuum cup type in the embodiment but may naturally be modified into an iron hand type, as shown in FIG. 11.

Figure 12:
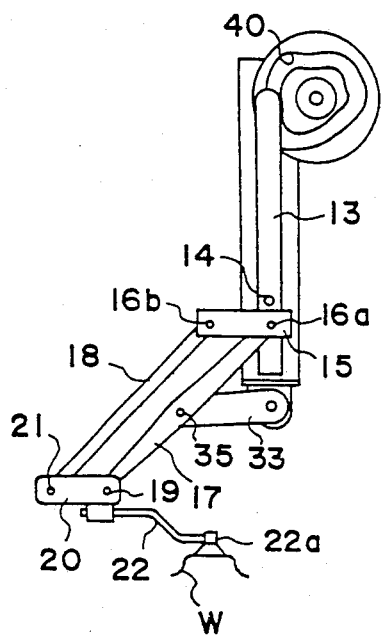
FIG. 12 is a front elevation showing another embodiment of the present invention.

FIG. 12 shows another embodiment of the present invention, which is characterized in that the cam mechanism is further simplified by using a grooved cam 40 as the cam member which is made rotatable in synchronism with the not shown rotating drive source. The remaining construction is identical to that of the foregoing first embodiment, and the constructional elements identical to those of the first embodiment are indicated at identical reference characters so that their repeated explanations are omitted. This similarly applies to FIG. 13.

Figure 13:
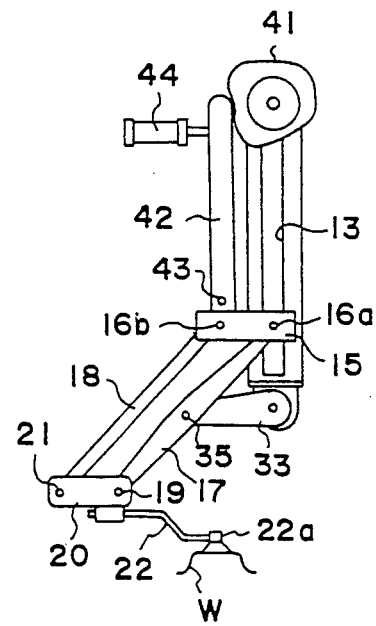
FIG. 13 is a front elevation showing still another embodiment of the present invention.

FIG. 13 shows still another embodiment of the present invention, which is characterized in that the cam mechanism is further simplified by using a plate cam 41 as the cam member which is synchronized with the not shown rotating drive source. Indicated at reference numeral 42 in FIG. 13 is a rocking rail which has its upper end portion abutting against the plate cam 41 and its lower end portion fitted slidably in one end portion of the slider link 15. The rocking rail 42 is enabled to rock on a pin 43 in the conveying direction of workpiece W. Indicated at numeral 44 is a solenoid for always urging the upper end of the rocking rail 42 toward the plate cam 41. Incidentally, the slider rail 13 is non-rotational in contrast to the foregoing embodiments, and engages with the slider link 15 with a small play.

Figure 14:
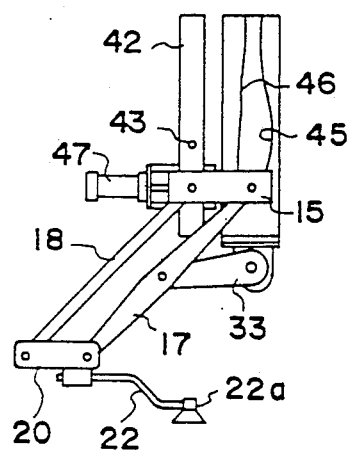
FIG. 14 is a front elevation showing an essential portion of an example in which the motions of the embodiment of FIG. 13 is modified.
Figure 15:
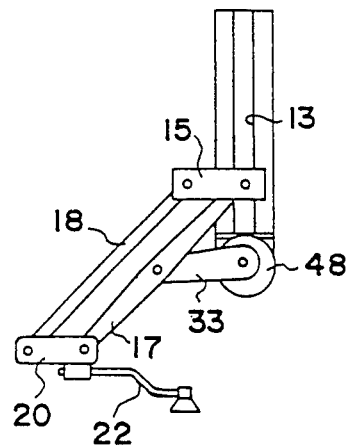
FIG. 15 is a front elevation showing an essential portion of an example in which a rotary solenoid is used as means for driving the working lever of the embodiment of FIG. 13.
Figure 16:
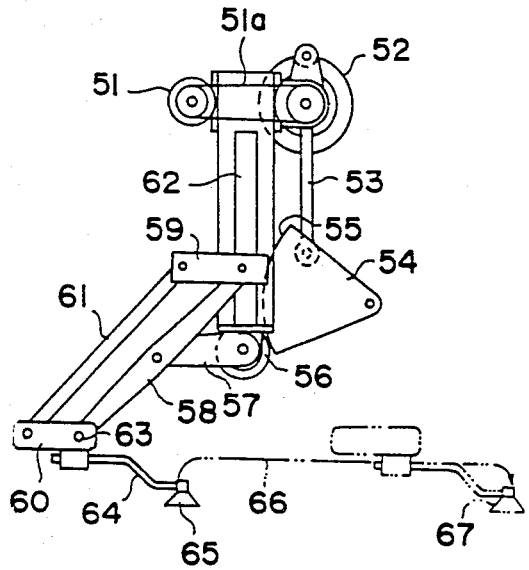
FIG. 16 is a front elevation showing the conveying apparatus of the prior art.
Figure 17:
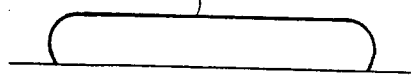
FIG. 17 is a diagram showing the motions of the conveying apparatus of FIG. 16.
Figure 18:
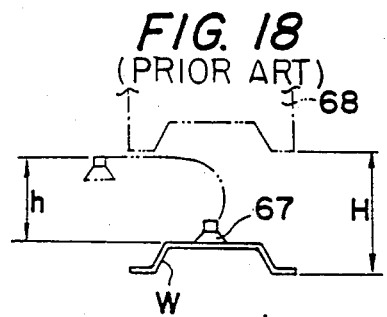
FIG. 18 is an enlarged view showing an essential portion of the work holder of the conveying apparatus of FIG. 16.
Figure 19:
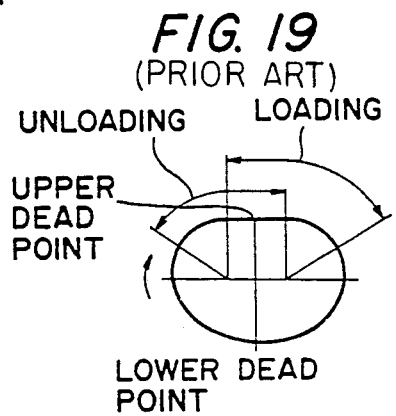
FIG. 19 is a diagram showing the timings of the working machine of the prior art.
Figure 20:
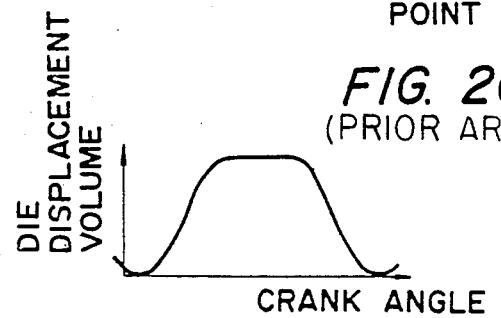
FIG. 20 is a diagram showing the cycle of the working machine of the prior art.

If the motions are to be changed in the present embodiment, as shown in FIG. 14, for example, the slider rail 13 has its one and the other sides formed with cam surfaces 45 and 46, respectively, so that the slider link 15 may slide along the cam surface 45 or 46 by the pushing or pulling force of a solenoid 47 connected to one end portion of the slider link 15. Incidentally, in order that the rocking lever 33 may reciprocatively rock in synchronism with the rotating drive source of the press, it is possible to use a drive source for reciprocatively rocking within a predetermined angular range, e.g., a rotary solenoid 48, as shown in FIG. 15. In this case, the conveying apparatus can have its construction further simplified.

As has been described hereinbefore, according to the present invention, interference between the conveying apparatus and the working machine can be avoided so that the working apparatus can be continuously run and so that the conveying apparatus can arbitrarily set the operating loci of the working motion and the return motion and can control is speed, thus enjoying an effect that the work transferring efficiency can be improved. Since the conveying apparatus need not be operated at the maximum speed at all times, as is different from the prior art, it can enjoy its reliability and durability. Since there is no need for special provision of the lifting device of the prior art, moreover, the construction can be accordingly simplified.

As previously stated, the present invention is exemplified by using as an example a press as the working machine but shouldn ot be limited thereto. The present invention can be applied to a wide working concept including the repeating proceedings such as the packaging, packing, selecting and aligning operations.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What is claimed is:

1. A workpiece conveying apparatus for a working machine comprising:
    a slider rail arranged vertically and in a rocking manner around a pin on the body of the workpiece conveying apparatus having a rotating drive source;
    a slider link slidably fitted in said slider rail and crossing at a right angle thereto;
    a parallel link comprising the slider link, a slider arm, a lower slider link and a sub arm, connected rotatably with each other;
    a cam means for causing the slider rail to rock around said pin;
    a rocking lever adapted to reciprocatively rock in synchronism with said rotating drive source and having its leading end portion contacted rotatably to a middle portion of said slider arm;
    a driving means for rocking the rocking lever; and
    a workpiece holder attached to said lower slider link, wherein the cam means comprises a plate cam, the apparatus further comprising a solenoid for abutting the slider rail to the plate cam.

2. A working conveying apparatus for a working mechanism comprising:
    a slider rail arranged vertically and in a rocking manner around a pin on the body of the workpiece conveying apparatus having a rotation drive source;
    a slider link slidably fitted in said slider rail and crossing at a right angle thereto;
    a parallel link comprising the slider link, a slider arm, a lower slider link and a sub arm, connected rotatably with each other;
    a cam means for causing the slider rail to rock around said pin;
    a rocking lever adapted to reciprocatively rock in synchronism with said rotating drive source and having its leading end portion contacted rotatably to a middle portion of said slider arm;
    a driving means for rocking the rocking lever; and
    a workpiece holder attached to said lower slider link, wherein the driving means comprises a rotary solenoid operating in synchronism with the rotating driving source.

3. A workpiece conveying apparatus for a working machine comprising: 'a slider rail arranged vertically on the body of said workpiece conveying apparatus having a rotating drive source;
    a slider link fitted crossing at right angles with and slidably in said slider rail;
    a parallel link consisting of the slider link, a slider arm, a lower slider link and a sub arm and being connected rotatably with each other;
    a rocking level adapted to reciprocatively rock in synchronism with the rotating drive source and having its leading end portion contacted rotatably to a middle portion of the slider arm;
    a driving means for the rocking lever;
    two cam members attached to the lower ends of the slider arm and the sub arm, respectively;
    a lever being provided with a workpiece holder; and
    a solenoid making the lever abut on both of the cams.

4. A workpiece conveying apparatus according to claim 3, wherein the driving means consists of a reduction mechanism having a crankshaft, and a piston rod connected to the crankshaft and a sector gear connected to the other end of the piston rod which meshes with the pinion gear of the rocking lever.

5. A workpiece conveying apparatus according to claim 3, wherein the driving means consists of a rotary solenoid in synchronism with the rotating driving source.

6. A workpiece conveying apparatus according to claim 3, wherein the workpiece holder is a vacuum cup.

7. A workpiece conveying apparatus according to claim 3, wherein the workpiece holder is an iron hand.

* * * * *